April 11, 1961 E. A. ROCKWELL 2,978,871
EMERGENCY SLACK TAKE-UP AND COMPOUND BOOSTER SYSTEM FOR BRAKES
Filed June 23, 1955 5 Sheets-Sheet 1

INVENTOR
Edward A. Rockwell
BY
Arthur Wright
ATTORNEY

April 11, 1961 E. A. ROCKWELL 2,978,871
EMERGENCY SLACK TAKE-UP AND COMPOUND BOOSTER SYSTEM FOR BRAKES
Filed June 23, 1955 5 Sheets-Sheet 3

INVENTOR
Edward A. Rockwell
BY
Arthur Wright
ATTORNEY

Fig. 4.

INVENTOR
Edward A. Rockwell
BY
Arthur Wright
ATTORNEY

United States Patent Office 2,978,871
Patented Apr. 11, 1961

2,978,871

EMERGENCY SLACK TAKE-UP AND COMPOUND BOOSTER SYSTEM FOR BRAKES

Edward A. Rockwell, 167 Ashdale Place, Los Angeles 49, Calif.

Filed June 23, 1955, Ser. No. 517,413

10 Claims. (Cl. 60—54.5)

My invention relates particularly to a hydraulic system and apparatus for the application of manual work as well as power for the operation and contorl of brakes, etc., and to apparatus for intensifying the manual force in the case of failure of the power source. It relates, also, to intensifying or increasing the ratio of the manual force applied to the brakes at the run-out of the power, when the power source is inadequate.

An object of my invention is to provide means to provide relative ease in operating a power brake system having a relatively short range of movement of the manual control pedal, even during the failure of the power.

Another object is to provide a system and apparatus for compounding the manual effort after an initial hydraulic volume has been displaced by the operation of a relatively short-range pedal, and to provide a power boost during the initial stage of operation so as to have a very light and easy pedal operation prior to the intensifier apparatus coming into operation.

A further object is, in a system comprising a power booster unit for the operation and control of hydraulic brakes, to provide in a second unit a slack take-up device in case of failure of the power source and simultaneously to provide a higher ratio between the pedal and wheel brakes for greater ease of operation.

Still another object is to provide means for bringing into operation the said second unit during normal power operation at the vacuum run-out point of the booster, thus making possible higher pressures from the manual boost than heretofore available.

Again, another object is to provide a booster unit having apparatus for adding a power boost to the manual effort for the operation and control of brakes having a fluid pressure connection for adapting the unit to a fluid pressure actuated ratio changing device, so as to operate upon failure of the power source and/or at the run-out of the power during normal operation. A more particular object is to provide control springs which are arranged to operate at substantially the same rate of intensified manual boost at the run-out point of the power.

A further object is to provide a system and apparatus for vacuum control in the operation of a booster unit, which has an output to input ratio that varies during the manual pressure gradient having a greater boost ratio at the beginning than at the run-out of the power boost.

A more specific object is to provide an improvement over the invention of my prior Patent No. 2,646,665, granted July 28, 1953, in order to more effectively control the variable ratio.

Also, I provide an improvement over my patent No. 2,646,665 aforesaid, with respect to the spring mounting, which is located between a light and a heavy spring in series, insuring more effective control of the manual forces applied, also in the arrangement of the Bellville control vacuum spring which permits a type of vacuum control operation having a variable ratio between the output and inlet, in order that the run-out compound booster will have an approximately proportioned continuous runout curve.

Still a further object is to arrange the grommet valve device disclosed in my prior Patent No. 2,448,464, granted August 31, 1948, and my application Ser. No. 300,141, filed July 22, 1952, now Patent No. 2,787,287, upon Fluid Control Valve Construction, which is a division thereof, so that the valve device is mounted on the power piston in order to provide a follow-up arrangement for lapping the valve. Also, an object is to provide, in the use of a valve of this character, an air suspended apparatus including a variable spring means cooperating to maintain the balance of presssure across the grommet valve, in order that the valve will maintain its lap position for holding the brakes in any position regardless of the vacuum applied.

Another object is to provide an improvement over my Reissue Patent No. 23,081, granted January 25, 1949, wherein the slack adjusting device functions merely on the lowering of the power applied at a predetermined limit, in this instance the vacuum differential. Also, it provides an arrangement of two valves and valve seats, in place of the double check valve disclosed in the said reissue patent, one of the check valves in the present invention being the liquid compensating valve for the master cylinder and the other check valve being associated with the follow-up compound boost piston.

The invention also provides an improvement over my prior Patent No. 2,244,966, granted June 10, 1941, relating to a hydraulic power control valve, wherein a similar mode of operation is secured in the present invention but in which the novelty of the arrangement resides in the features pertaining to the vacuum operation and the valve cooperating with elements of a power booster.

A further object is to provide an improved follow-up valve device, over my prior Patent No. 2,289,043, granted July 7, 1942, which will become more apparent from the description hereinafter.

The invention also comprises an improvement over my prior Patent No. 2,372,015, granted March 20, 1945, wherein the present invention provides a power booster unit arranged to effect a ratio change by a vacuum controlled piston associated with a compound booster, and wherein the slack adjusting feature comes into play merely during low vacuum and/or run-out of the power.

The present invention is, furthermore, an improvement over the invention disclosed in my prior Patent No. 2,388,220, granted October 30, 1945, relating to pressure responsive supporting means in which there is a balancing of the pressure with respect to an air suspended unit, and in which the valve lever disclosed in the said patent is eliminated, so that the valve in the present invention can be arranged on the central axis of the unit. Specifically the improvement involves a vacuum reservoir for the booster unit, the latter having therein a slack take-up device as well as a compound booster.

In the present invention, there is also an improvement over my prior Patent No. 2,244,317, granted June 3, 1941, relating to the accumulation of the vacuum as distinguished from the hydraulic pressure accumulator in the said patent, and in which the improvement resides in combining this general mode of operation with a power booster having the accumulator pressure utilized in connection with the booster operation, as well as applying a limited spring pressure on the brakes at the run-out of the booster, or upon failure of the power source.

The distinguishing features of the improvements herein will become more apparent in the description hereinafter, in the operation of the present invention, also in the improvements herein over the subject matter of my Patent No. 2,418,666, granted April 8, 1947, which is a division of Patent No. 2,244,317 aforesaid, both of which are full power arrangements and have no manual follow-through boost.

Currently, vacuum power boosters are being applied to passenger automobiles in increasing numbers, and the drivers thereof have found a real advantage in a short range pedal operation, as the brakes can be applied quickly and easily, without much shift in the foot of the driver being required, as was previously necessary in lifting the leg for the operation of a long range pedal. Although normally the short range pedal mode of operation is desirable, it is found in case of vacuum failure that in order to control the vehicle adequately a relatively greater manual force must be applied to the pedal in view of the decreased leverage occasioned by the short range pedal, and that this provides a real hazard in the operation of the vehicle. It is a major object of this invention to eliminate this hazard and to provide a safer vacuum booster system and apparatus so that the brakes can be applied under emergency operation with very nearly the usual ease of operation.

The current booster systems may provide adequate pressures normally but where the brake lining becomes wet or its holding power fades, for example upon a severe stop on a hill, the manual boost at the run-out of the booster is not sufficient to make a safe stop, and in order to provide an increased ratio at the run-out of the power in the present invention it is desired to have an increased volume of displaced fluid also, so as to compensate for fading and stretching of the brake drums and other parts of the brakes. The substantially increased volume, while maintaining pressures in this invention, makes feasible the use of a type of brake utilizing normal pressures, rather than the highly self-energized type. With the normal-pressure type of brake it is apparent that the mere manual forces would be ineffective in case of vacuum failure for controlling the vehicle, but they are entirely adequate in the present invention.

It will be understood, also, that a distinction should be made as to the volume required merely for static conditions of braking and that which occurs mostly in the emergency operation at slow speeds when the engine may stall. At high speeds there is not much likelihood of the engine stalling in the current automobiles and during braking there is generally adequate vacuum available. During high speed stops, however, it is desirable not only to have adequate pressure but adequate volume available to take care of the rapidly fading conditions of the brake lining and the expansion of the drums. At lower speeds and merely for holding the vehicle in case the engine stalls, or during conditions of towing or coasting, it is not necessary to have as much volume as the fading condition is not present, but it is possible with the present invention to have adequate pressures without undue force being necessary on the pedal. An example of these volumes and pressures will be given hereinafter in detail, by reference to a performance chart.

In my copending application upon Multiple Ratio Brake Pedal Construction, Ser. No. 464,468, filed October 25, 1954, now Patent No. 2,900,054, issued August 18, 1959, I have provided a mechanical arrangement for increasing the leverage and giving a longer range of travel to the pedal in case of vacuum failure, this being accomplished by the accumulation of a spring force to be released upon the failure of the vacuum, and it will be apparent that the present invention is similar in some respects thereto in the results obtained in making available more manual work in case of failure of the power, but in the present invention this is not accomplished by a mechanical change in ratio but by a hydraulic ratio change between the manual means and the brake. In addition, in place of the pedal being extended, I use an apparatus for taking up the slack in the brake system while maintaining the pedal in its normal position. Of course, this result may provide a slight drag of the brakes during emergency operations, but this is not a real disadvantage in view of the fact that the emergency operation only occurs when the vehicle is going at a lower speed. Also, it will be apparent that a slight drag of the brake would not be too much of a disadvantage when towing the vehicle or when it is being pushed or when starting the engine.

The subject matter of this application also relates to and is an improvement on the invention in my copending application upon Power Compound Booster for Brakes, Ser. No. 473,884, filed December 8, 1954, now Patent No. 2,936,590, which involves a compound booster at the run-out, but which does not have a slack adjuster apparatus although it does involve automatic clearance adjustment.

Further objects of my invention will appear from the detailed description of the same hereinafter. While my invention is capable of embodiment in many different forms, for the purpose of illustration I have shown only one form thereof in the accompanying drawings, in which—

Figure 1:
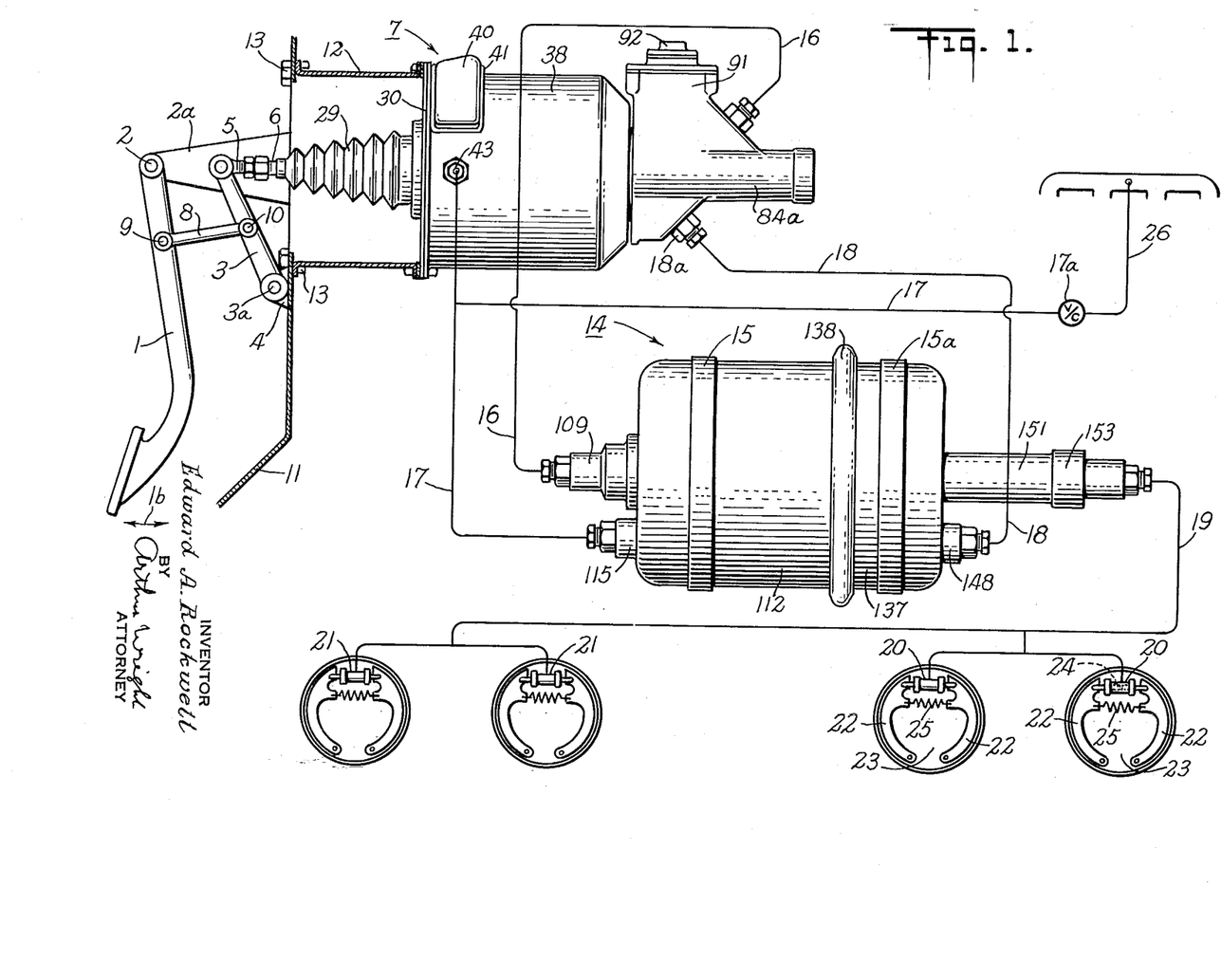
Fig. 1 is a diagrammatic vertical elevation of the pedal linkage and booster unit as applied to an automobile, including a view of the wheel brake system as connected to the compound booster, and the fluid connections for the complete system.

Turning to Fig. 1, there is shown a hydraulic system constructed according to the invention installed to operate an automotive brake assembly which includes a foot operated brake pedal 1 having a pivotal support 2 on a bracket 2a provided on the dash of the automobile and a secondary lever 3 having a pivotal support 3a located on a similar bracket 4. At the top of the secondary lever 3 there is a clevis pin connection 5 for connection to a push rod 6, which terminates within a booster unit 7, as shown more fully in Fig. 4. There is, also, a link connection 8 fulcrumed at 9 on the brake pedal 1, this link connection 8 being composed of two links on opposite sides of the pedal 1. At the other end of the links 8 there is a clevis pin 10, with the usual cotter pin, providing a fastening for the clevis. The links 8 are so arranged as to require merely a short range of movement of the pedal 1 as indicated at 1b by the arrow showing the range of movement of the bottom of the pedal with regard to a floorboard 11 of the automobile. This range of movement may be of the order, for example, from 2 to 3″, whereas the movement of the clevis pin 5 for the actuation of the brake may have a total movement of about 3″. It is evident that variations of this relative travel can be achieved by changing the fulcrum points 9 and 10. The booster unit 7 is supported on the dash by a mounting bracket 12 which is fastened to the back of the dash by bolts 13, in the engine compartment, the booster 7 having for this purpose appropriate mounting holes, formed in a flange of the cylinder of the units 7. A slack take-up and run-out compound booster unit 14 is preferably mounted on the automobile frame near the booster unit 7, in the engine compartment, by suitable brackets 15 and 15a. This unit 14 is connected to the booster unit 7 hydraulically by a tube 16 and by a vacuum hose connection 17, leading, for example, to a vacuum check valve 17a and the engine manifold, and by a hose connection 18 with a screw-threaded boss 18a, for transmitting to the unit 14 the control pressure acting upon a booster piston in the unit 7. The output of the unit 14 is connected hydraulically by a tubing 19 to wheel brake cylinders 20 and 21 on the front and rear wheel brakes, respectively. The brake shoes 22 are mounted on wheel backing plates 23 and are moved into operation by brake pistons 24, in the cylinders 20 and 21, and are retracted by pull-back springs 25.

The vacuum connection 17, leading to the booster units 7, 14 from the vacuum check valve 17a, connects the units to the intake manifold of the automobile through a tube 26.

When utilizing the pedal linkage shown in Fig. 1, operation of the pedal lever 1 results in pushing forwardly the push rod 6, which is in contact with a wear plate 27 in an air valve 28 having outer flutings 28a. The push rod is also housed in a collapsible rubber boot 29 attached by its small end to the rod 6 and at its larger end to a stamped head 30 of the booster unit 7 by a split ring 31 overlying a recessed flange 32 on said head 30. The flange 32 is screw-threaded to receive a stop and spring casing 33, having a hellical spring 34 therein seated at one end against a flange 35 on the inner end of the casing 33 and at the other end against a flat gasket 36 which seals an air vent opening 37 in the spring casing and permits slight angular movement of the push rod 6. The head 30 is fastened, in any desired way, such as by cap screws and nuts through mating flange lugs, as shown in Fig. 1, to a cylindrical booster cylinder shell 38, which has air vent openings 39 carrying an air filter cover 40, having a loose peripheral gasket 41, secured in place by means of a screw 42. A vacuum port 43 (see Figure 1) is also provided, in connection with the pipe 17.

As above referred to, the rod 6 fits within the air valve 28, the periphery of which is fluted and has a forwardly located peripheral flange 44 which has a rearwardly directed annular lip 45 normally spaced away from the forward face of an annular grommet valve 46 of rubber or rubber substitute, which is similar in construction to the grommet valve disclosed in my application upon fluid control valve construction. The grommet 46 has at the front an outwardly directed flange 47 held in place by a ring 48 and screws 49 on a piston 50, which latter has a valve seat 51 to receive a rear flange 52 located on the grommet 46. The grommet 46, furthermore, has between the flanges 47 and 52 an annular vacuum chamber 53 which communicates by a radial passage 54 with a recess 55 in the piston 50 over which there is a clamping cover plate 56 held in place by the screws 49 and by screws 57 to provide a tight connection to a flexible tube 58 of rubber or rubber substitute fastened to the vacuum port 43.

Figure 6:
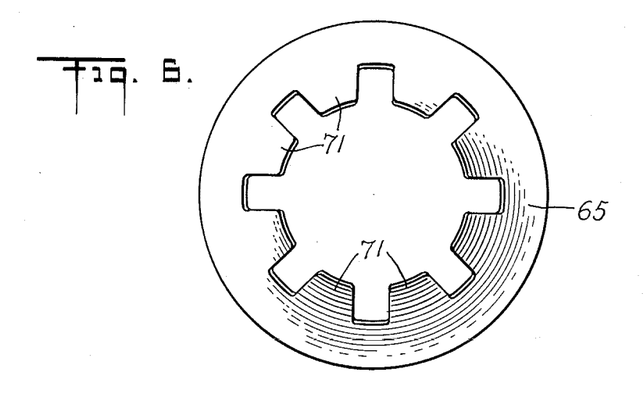
Fig. 6 is a vertical flat view of the Bellville vacuum spring.

The flutings 28a on the air valve 28 provide an air passageway for the air suspended piston 50 which leads by the passage beneath the lip 45 to a forward air space 59 and to openings 60 in a shell 61, which is also held in place by the screws 49. The forward end of the shell 61 carries a flexible disc of rubber 62 to act as a stop in the return movement of the piston 50. It will be noted that the shell 61 also extends outwardly so as to hold in place a lubricating felt ring 63 overlying the outer periphery of the ring 48 and, together with a spring ring 63a, so as to hold in sealing position an outer right-angular piston ring leather seal 64 located on the forward face of the piston 50. On the rear face of the piston 50 there is located a Bellville vacuum control spring 65, of the type shown in Fig. 6. The inner periphery thereof is retained in place by a split ring 69 in a notched flange 70 formed by suitable spaced lugs extending through the star-shaped openings in the Bellville spring 65 on the piston 50. Said inner periphery of the spring 65 has, furthermore, inwardly directed fingers 71 which are adapted to press rearwardly, under the influence of the vacuum, against a forward flange 72 of a spider shell 73 having perforations 74, and a power plunger 75. Said shell 73 also serves as a support for one end of a heavy helical spring 76, the other end of which is received on the outer flange 77 of a spring-retainer casing 78 within which there is a lighter spring 79, resting at its forward end against a ring 80 bearing against the air valve 28. There is also a helical balancing spring 82, having an exact and relatively high rate and a very low initial force, seated at one end of the spider shell 73 and at the other end on a ring 81 on the grommet flange 52. Furthermore, it will be noted that the spider shell 73 carries on its periphery in a notch 83 one end of a helical return spring 84 which is seated at its other end at the end of the booster shell 38 which it will be seen will locate the piston 50 and tube 58 in the correct index position.

Figure 3:
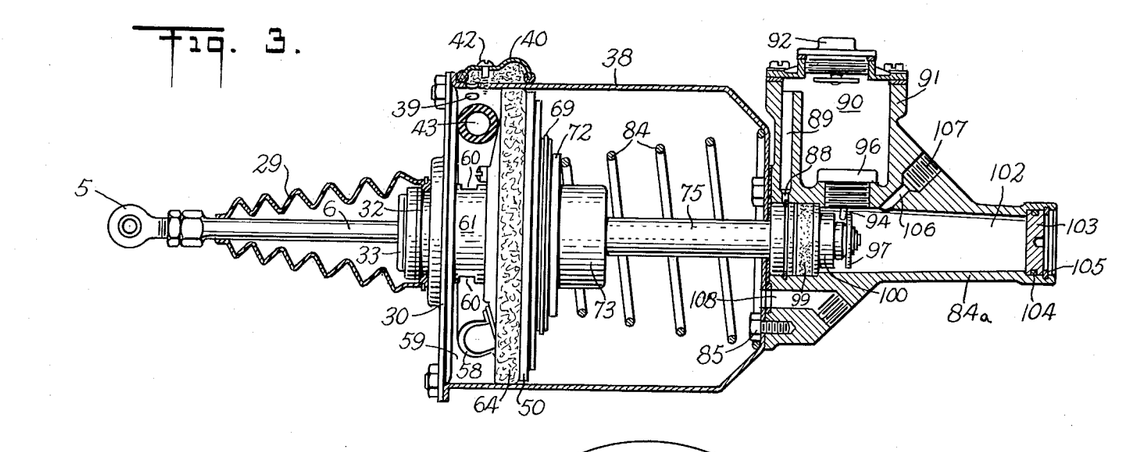
Fig. 3 is an enlarged vertical section through the power booster unit.

The power plunger 75 extends through this end of the booster shell 38 into a master cylinder casing 84a, to which it is attached by screws 85 and a gasket 86, provided with a packing gland 87, having a hydraulic port 88 leading by a passage 89 to a reservoir chamber 90 in a master cylinder reservoir 91, having a vented cover 92. Liquid flows therefrom through a port 93, past a tiltable check valve 94 normally seated by a spring 95 in a screw-threaded valve retainer-casing, but which is tilted by the return of the plunger 75. The slight opening of valve 94 in the retracted position of the plunger can be adjusted by the stop 33 screw-threaded in the head 30. The valve is tilted by means of a ring 97 fastened to the end of the plunger 75 by a snap ring 98 set in a suitable groove in a reduced portion on the end of the plunger 75. The spring 95 is relatively light and will permit opening under slight vacuum to replenish the system. On the plunger 75 there is also a lip seal 99, held in place by a guide bushing 100 in an annular recess 101, within a cylindrical bore acting as a master cylinder 102 closed as shown in Fig. 3 by a plug 103 and seal 104 held in place by a snap ring 105. An outlet passage 106 leads from the cylinder 102 to a screw-threaded port 107, to receive the usual pipe fitting, from which the pressure liquid is delivered to the pipe 16.

The screw-threaded boss or pipe fitting 18a, is located in the casing 84a where it leads by a passage 108 to the interior of the booster cylinder 38. In this manner the controlled vacuum passageway 108 leads to the pipe 18, connected to the slack take-up unit 14. The unit 14 is also connected to the booster unit 7 by the pipe 16, and supplied with vacuum by the pipe 17. The hydraulic liquid delivered to the unit 14 by the pipe 16 enters a boss 109 screw-threaded to a plunger cylinder 110 having a nut 111 thereon on the inside of a slack take-up shell 112 carrying between the nut 111 and the boss 109 a gasket 113 on the outside of the shell 112, and on the inside of the shell 112 a plate 114 for receiving the inner end of a boss 115 having therein a thread to receive a pipe fitting for the vacuum pipe 17. The controlled hydraulic pressure received by the pipe 16 initially passes by an unseated liquid shut-off valve 116 on a valve stem 117 having a light helical spring 118 around the stem and fastened thereto by a suitable perforated stop washer 119 press fitted into a bore in the boss 109, the said other end of the spring 118 being supported by a piston 120 having a valve seat 121 for the conical rubber valve 116. The piston 120 is located within the cylinder 110 and is provided with lip seals 122 and 123 within said cylinder, one of which seals is adapted to seal under brake pressure fluid and the other of which is to prevent the atmosphere entering the brake line under operating conditions. There is a rubber faced seal 123a molded in a suitable groove in the piston 120 for closing off the full area of said piston and having an inner diameter approximately equal to the inner diameter of the plunger 124. The general reference numeral 200 refers to the assembly including the piston 120 and the hollow compound plungers 124, 142 which serve as casings for the spring 127. A nut 128 screwed on the boss, clamps in place, through a gasket 129, a forward diaphragm clamping plate 130 which is spaced by a ring 131 from a rear diaphragm clamping plate 132. The plates 130 and 132 clamp between their peripheries the inner beaded edge of an annular flexible rubber diaphragm 133, the outer periphery of which is provided with a bead 134 clamped between the slack adjuster shell 112 by means of a flange 135 thereon and a flange 136 on a rearwardly directed slack adjuster shell 137. A split annular channel 138 clamps the flanges 135 and 136 together. The rear shell 137 has a central boss 139 passing through the end of the shell 137 to receive, within a seal 140 held in place by a retaining ring 141, the cylindrical plunger 142 which is part of the same tube as the plunger 124, but the outer surface of which is highly finished to slide in rubber seals 140 and 150. The plunger 142 is clamped to the diaphragm plate 132 by a flange 144 and a gasket 145, by means of nut 128. The boss 139 also serves to clamp against a plate 147, spot welded to the shell 137, which has fastened thereto a boss 148 which is connected to the pipe 18. The rearward end of the spring 127 is supported by a split ring 149 within the end of the tubular plunger 142 and on the outside of said plunger there is an additional lip seal 150 within the boss 139 and a retaining washer 150a. On the outside of the boss 139 there is, furthermore, screw-threaded a high pressure cylinder 151 having a ring seal 152. At the rear end of the cylinder 151 there is a screw-threaded fitting 153 with a seal 154 which is provided with a threaded opening to receive the pipe fitting for the pipe 19 to the brake cylinders 20 and 21. The rear end of the spring retaining stem 126 is fastened by nuts 127' to a plate 155 having a hole 155a at the top thereof to aid in the elimination of all air from the system initially. The plate 155 is held in place between the fitting 153 and the cylinder 151. The plate 155 also supports a helical spring 156 on its rear face, which provides a bias to a residual pressure check valve 157 extending into a lip seal 158 having a spring rate in relation to the effective area of the valve to provide a residual pressure on the release of the brakes of from 7 to 10 p.s.i., while permitting a free flow through holes 157a and the check valve lip 158.

Figure 2:
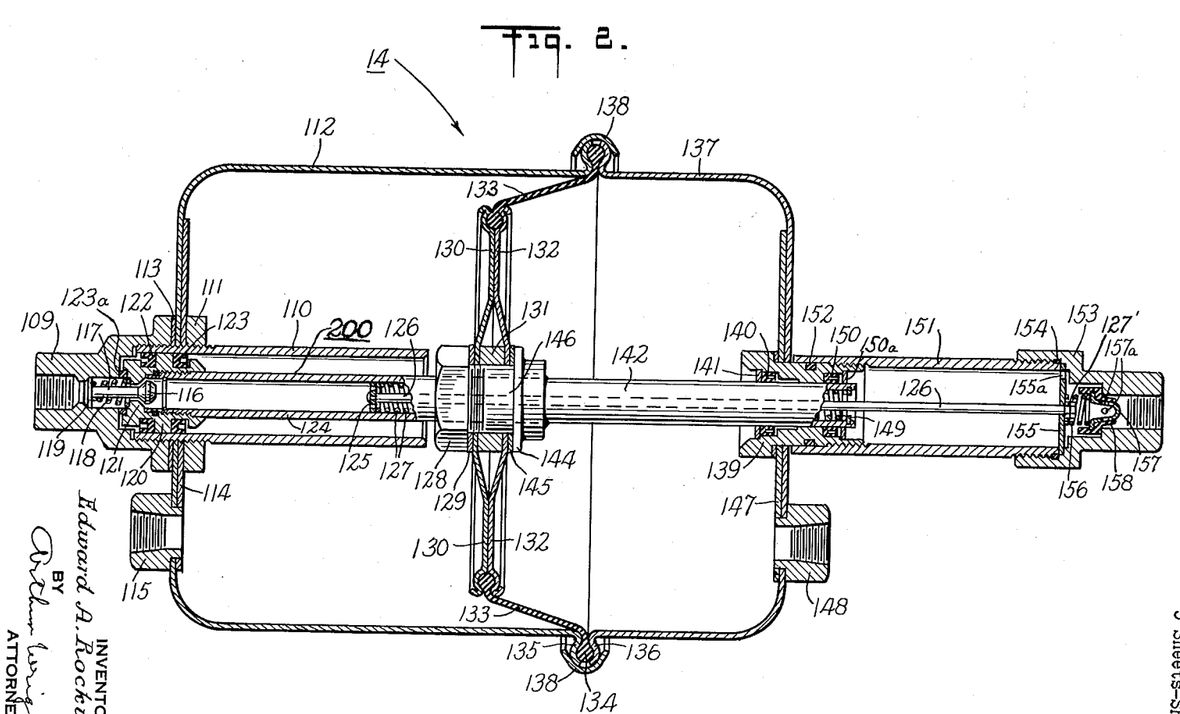
Fig. 2 is a vertical sectional view, enlarged, of the emergency slack take-up and run-out compound booster unit.

To summarize the operation of the apparatus, it will be first assumed that the vehicle upon which the device is installed is running normally with vacuum from the exhaust manifold being supplied through pipes 26 and 17 to the annular recess 55 in the vacuum booster unit 7 and to the interior of the shell 112 of the hydraulic booster unit 14. In the vacuum booster unit 7 the pressure on each side of the power piston 50 will be atmospheric, since air may enter openings 39 and can reach the opposite side of the piston through the air control valve 45. Thus this piston 50 is urged to the left in Fig. 4 by spring 84. In hydraulic booster unit 14 the compound plunger 120, 124, 142 will be held by air pressure in its Fig. 2 position since the shell 112 is evacuated and the shell 137 is connected to the atmospheric pressure in shell 38 of unit 7. It will be noted that the long spring 127 in unit 14 will be compressed by air pressure exerted against diaphragm 133 and the structure of the compound plunger.

Figure 4:
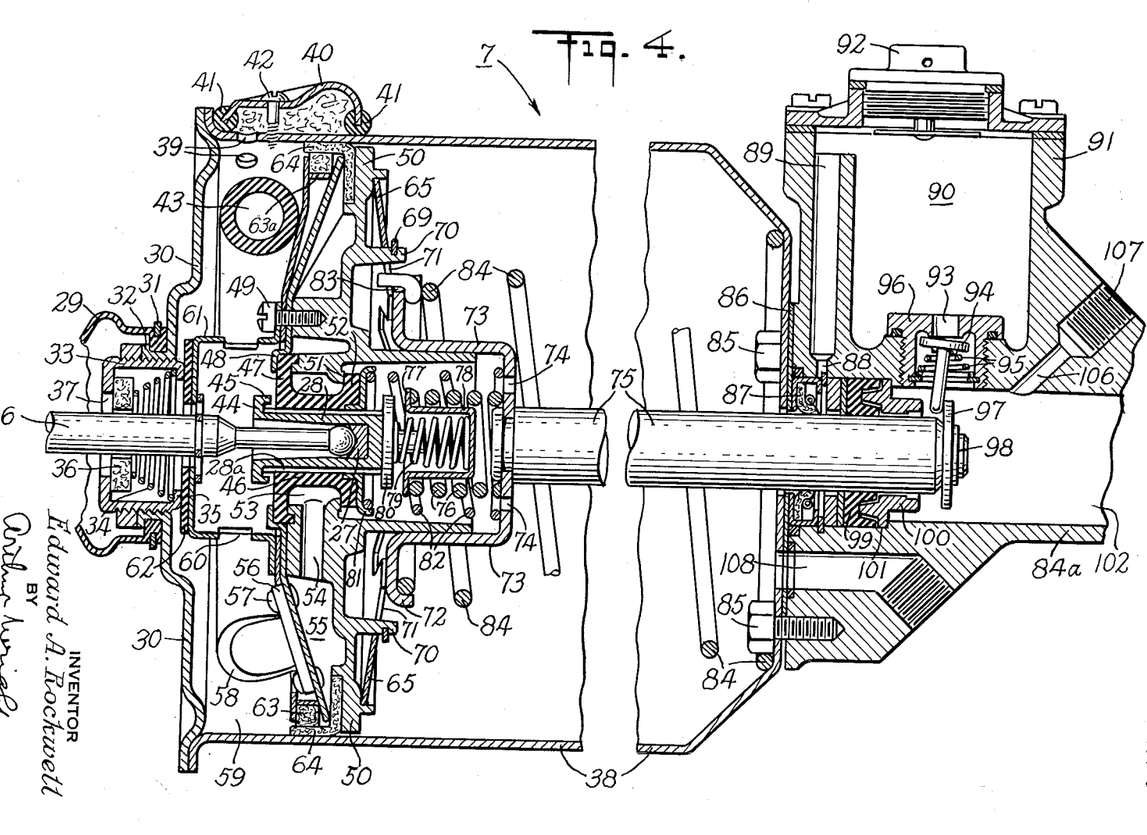
Fig. 4 is a vertical section like Fig. 3, enlarged, showing the Bellville control vacuum spring therein.

When the brake pedal 1 is actuated, actuating rod 6 will move to the right in Fig. 4, sliding the valve member 28 to first close the air control valve 45 and then open the vacuum control valve 51. Closing the valve 45 prevents air from passing from the left of power piston 50 to its right, and opening valve 51 connects the interior of shell 38 at the right of piston 50 to the annular recess 55 and the source of vacuum. Thus, as the shell 38 is evacuated, the air pressure force on the left of the power piston 50 strongly "boosts" the manual force exerted through the actuating rod 6, and together these forces move hydraulic plunger 75 into chamber 102, which closes the supply valve 94 and forces hydraulic fluid into the tube 16.

The fluid from tube 16 is free to pass through the hydraulic booster unit 14 by being admitted through the open valve 116 and entering the hollow compound plunger 120, 124, 142. From the plunger 142 the fluid is free to flow into high pressure cylinder 151 and from there to the line 19 for operating the brakes.

So that brake pedal 1 need be operated only through a short range, the plunger 75 is large enough to displace sufficient fluid to actuate the brakes when moved only a short distance. Moving such a large plunger requires considerable force which normally is supplied by the vacuum power booster unit 7. If however, there is no power boost available, the average driver does not have the strength to apply sufficient manual pressure to the brake pedal 1 to bring the automobile to a safe stop, and for this reason the hydraulic booster unit 14 is provided.

The vacuum power boost by unit 7 is not available in two major cases. First, if there is a vacuum supply failure, no pressure differential can be created on opposite sides of the power piston 50 and thus no power boost can be provided. Second, the vacuum boost unit 7 can provide boosting power only up to a condition which is called the "run-out" point. The run-out condition exists in unit 7 when the differential air pressures on the piston 50 equals the resisting force of the return spring 84, and it is not possible to further evacuate the shell 38 at the right of the power piston since the vacuum therein is already equal to the vacuum source in line 17. In other words, the available supply of additional power-boosting vacuum has "run-out." In this latter case there is, of course, considerable force exerted by the booster unit 7 even though it is in the run-out condition, but often further movement of plunger 75 is required due to: (1) the development of slack in the hydraulic system which is caused by the heat expansion of the brake drums away from the brake shoes, and (2) to compensate for brake fading conditions.

When there is a vacuum failure or when the run-out condition is approached in unit 7, the hydraulic booster unit 14 is effective to automatically provide a compound hydraulic power boost so that normal manual pressure on pedal 1 will be sufficient to stop the automobile. This is accomplished by the automatic shift of the compound piston 120, 124, 142 to the right in Fig. 2 when there is a vacuum failure or when the run-out condition in unit 7 is approached. In the case of a vacuum failure there exists equal atmospheric pressure in each of the shells 112 and 137 and the compressed spring 127 will, therefore, shift the piston to the right. Or, in the case of an approaching run-out condition, the shell 137 will be fully evacuated due to the tube 18 connection from the vacuum boost unit 7 and, therefore, as an equal vacuum in shells 137 and 112 is approached, the compressed spring 127 will force the piston to the right.

Figure 5:
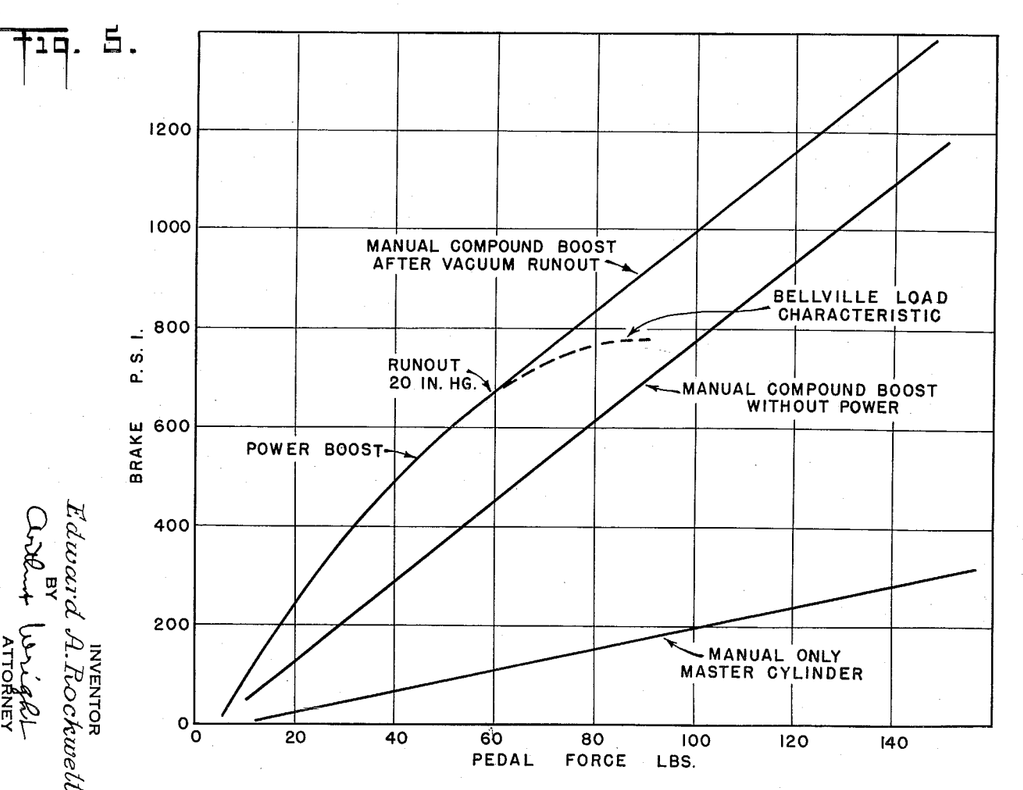
Fig. 5 comprises curves showing the relationship between the pedal force in pounds and the brake pressure in p.s.i. It illustrates also the theoretical manual forces and the pressures developed manually by the master cylinder, the booster force of the combined power and the manual pressures of the booster and the output pressures developed merely by the compound booster without power.

When the compound piston 120, 124, 142 moves to the right, the fluid seal 115 closes under the urging of spring 118 since the seal stem 117 no longer engages washer 19 to hold it open, and the seal 123a moves away from the boss 109 to expose the face of piston 120. Thus, the fluid pressure manually imposed by plunger 75 and transmitted through pipe 16 impinges against the plunger 120 and forces it along its cylinder 110, which in turn simultaneously forces the plunger 142 into the high pressure cylinder 151. Plunger 120 is larger than plunger 75, thus the manual force exerted by the plunger 75 is hydraulically multiplied and the plunger 120 exerts a higher force on plunger 124, 142. Plunger 124, 142 is smaller than plunger 120 and thus its movement builds up a higher fluid pressure in high pressure cylinder 151 than exists in cylinder 110. This combination of multiplying forces and increasing fluid pressures resulting from the relative sizes of the plungers 75, 120 and 124, 142 produce a substantial hydraulic boost which is almost a continuation of the effect of the vacuum power boost discussed above, see Fig. 5.

The following are examples of relative dimensions which are desirable and effective for use with a vehicle weighing in the neighborhood of 4000 lbs.:

Hydraulic power plunger 75 diameter ¾", effective stroke 2.891 in., volume 1.275 cu. in., vacuum power piston 50 diameter 6 in., vacuum power piston stroke 3.054 in. and Bellville spring 65 deflection.

Run-out booster, small plunger 142 diameter 21/32", large piston 120 diameter 1 3/16", diaphragm clamping plates 130 and 132, 6" outside diameter, reservoir shell inside diameter 7", static volume 1.115 cu. in. (with small plunger 142), effective stroke 3", required volume before reserve for stretch and wear of brake linings .677 cu. in., total required volume .967 cu. in. for static conditions. With the present invention and utilizing the same size vacuum booster cylinder as on current models, the combined available volume displacement for the operation of the brake shoes with the above example of dimensions would be 1.303 cu. in. and without power under static conditions would be 1.115 cu. in. The long slack take-up spring 127 can have a force of 20 lb. in retracted position and 18 lb. in the full stroke position. The force of the spring 127 is sufficiently low to just take up the brake shoes and overcome the pull-back springs 25 and 26. The movable wall 130 formed by the diaphragm 133 in the second stage unit 14 is yieldingly urged to the right (Fig. 2) by the light spring 127 and is normally held against such spring in its left-hand position by the differential pressure acting on the wall; this differential pressure is developed between the chamber 112 of the unit 14, which is connected to a source of vacuum through the conduit 17, and the chamber 137 which is initially at atmospheric pressure but is gradually evacuated during the operation of the power unit. The latter chamber 137 is connected to the chamber ahead of the power piston 50 and is gradually evacuated by the valve 28 upon continued operation of the brake pedal, until the pressures on the opposite sides of the diaphragm 133 are about the same and the differential pressure approaches zero. This condition is termed power source run-out and as such run-out is approached, a point is reached where the spring 127 acting on the diaphragm 133 overcomes the force developed by the vacuum differential on the opposite sides of the diaphragm. At this point the wall formed by the diaphragm 133 is moved to the right by the spring 127, which also moves the plunger 124 to the right and closes the control valve 116 bringing the compound piston into operation.

It will be recognized that when the hydraulic booster unit 14 is brought into operation additional fluid must be supplied to the hydraulic line. This is because plunger 75 must move a substantial amount of fluid into cylinder 110 in order to move the plunger 120 and produce the hydraulic boost desired. This additional fluid is supplied to valve 94 from the reservoir 90 when the plunger 75 is returned or partially returned under the urging of spring 84 so as to open valve 94 and allow the compressed spring 127 to move plunger 120 and draw fluid past the valve 94 into the hydraulic system.

I utilize the well known deflection characteristic of the Bellville washer to control the vacuum in conjunction with the manual springs 79 and 76 for reaction on the pedal, for example the initial reaction force of the spring 79 may be as low as 5 lb., whereas the force of the spring 76 would represent a point at which the booster runs out, for example, at 20" and would have a value of 60 lb. in its fully compressed position. This arrangement will give, initially, a high rate of boost at the beginning equal almost to full power, so that braking initially can be controlled with very light forces on the pedal.

As the Bellville spring 65 is deflected the stiffer reaction spring 76 will come into action at a fast rate, whereas the Bellville spring 65, as it deflects towards flat, diminishes its rate of increase. In fact, it would have a negative rate even before it approaches flat.

The purpose of the high rate spring 82 is gradually to increase the closing pressure of the vacuum valve 51 to offset the increased difference of pressure across the grommet valve due to the atmosphere on one side and the increasing vacuum admitted past the valve on the other side. The spring initially is only very slightly compressed but the movement of the vacuum piston 50 relative to the spring 82 compresses the spring, rapidly increasing the vacuum valve closure pressure thus preventing the vacuum valve from opening of its own accord and assuring progressive lap position of the valves.

While I have described my invention above in detail I wish it to be understood that many changes may be made therein without departing from the spirit of the same, and the intention is to cover all modifications alternative constructions and equivalents, falling within the spirit and scope of the invention as expressed in the appended claims. In the appended claims, by way of example, the first stage cylinder is provided by the cylinder casing 84a and has a piston 75 therein. An expansible motor mechanism provided by the piston 50 within the power unit casing 38, is connected to receive vacuum from the engine manifold through the conduit 17 and is acted on by a differential pressure controlled by the pedal operated air valve 28. The piston 75 within the cylinder casing 84a is operated directly by the pedal 1 after run-out so that the pressure developed by the piston continues to increase, power source run-out as used in the claims meaning either power supply failure or run-out as defined above where the available power from the source has run out. The pressure in the first stage cylinder operates the differential piston 124, 142 in the second stage booster cylinder 110, 151 after the valve 116 is closed to trap fluid between the differential piston and the first stage cylinder. This differential piston includes a smaller area, defined by the outer diameter of the piston 142, which acts on fluid in the cylinder casing 151 to actuate the wheel cylinders, and also includes the larger area defined by the inner diameter of the cylinder 110 which is directly responsive to fluid pressure developed in the first stage cylinder. Control means, including the movable wall provided by the diaphragm 133, operates the valve 116 by moving the piston 124 to the right (Fig. 2) upon power source run-out including power failure or run-out as defined above.

I claim:

1. In a hydraulic braking system having a pedal and wheel cylinders to apply the brakes, the combination comprising, a first stage cylinder with a piston therein for producing hydraulic pressure for the wheel cylinders, an expansible motor mechanism for acting on said piston to increase the hydraulic pressure in said cylinder, a source of power to operate said expansible motor mechanism, pedal operated valve means to direct power from said source to said expansible motor mechanism in the first boost stage until power source run-out is reached, means connecting said pedal to said piston for continued movement of the piston after run-out to increase the hydraulic pressure in said cylinder, and a second stage hydraulic booster cylinder with a differential piston therein having a larger area responsive to the hydraulic pressure in said first stage cylinder after run-out and a smaller area for producing hydraulic pressure for the wheel cylinders, whereby the hydraulic pressure in the first stage cylinder is hydraulically multiplied after run-out to obtain a second stage boost.

2. In a hydraulic braking system having a pedal and wheel cylinders to apply the brakes, the combination comprising, a first stage cylinder with a piston therein for producing hydraulic pressure for the wheel cylinders, an expansible motor mechanism for acting on said piston to increase the hydraulic pressure in said cylinder, a source of power to operate said expansible motor mechanism, pedal operated valve means to direct power from said source to said expansible motor mechanism in the first boost stage until power source run-out is reached, means connecting said pedal to said piston for continued movement of the piston after run-out to increase the hydraulic pressure in said cylinder, a second stage hydraulic booster cylinder with a differential piston therein having a smaller area for producing hydraulic pressure for the wheel cylinders, and a larger area, and control means responsive to power modulated by said pedal operated valve means for applying hydraulic pressure in said first stage cylinder after power source run-out against said larger area of the differential piston, whereby the hydraulic pressure in the first stage cylinder is hydraulically multiplied after run-out to obtain a second stage boost.

3. In a hydraulic braking system having a pedal and wheel cylinders to apply the brakes, the combination comprising, a first stage cylinder with a piston therein for producing hydraulic pressure for the wheel cylinders, an expansible motor mechanism for acting on said piston to increase the hydraulic pressure in said cylinder, a source of power to operate said expansible motor mechanism, pedal operated valve means to direct power from said source to said expansible motor mechanism in the first boost stage until power source run-out is reached, means connecting said pedal to said piston for continued movement of the piston atfer run-out to increase the hydraulic pressure in said cylinder, a second stage hydraulic booster cylinder having a hollow differential piston therein with faces of different effective area, means communicating through said hollow piston supplying hydraulic pressure from said first stage cylinder to said wheel cylinders in the first boost stage, and control means operated by said source upon power source run-out for cutting off communication through said hollow differential piston and placing a larger face thereof in communication with said first stage cylinder for applying hydraulic pressure after run-out against said larger face of the differential piston while providing a smaller face for producing hydraulic pressure for the wheel cylinders, whereby the hydraulic pressure in said first stage cylinder is hydraulically multiplied after power source run-out by said differential piston to obtain a second stage boost.

4. In a hydraulic braking system having a pedal and wheel cylinders to apply the brakes, the combination comprising, a first stage cylinder with a piston therein for producing hydraulic pressure for the wheel cylinders, an expansible motor mechanism for acting on said piston to increase the hydraulic pressure in said cylinder, a source of power to operate said expansible motor mechanism, pedal operated valve means to direct power from said source to said expansible motor mechanism in the first boost stage until power source run-out is reached, means connecting said pedal to said piston for continued movement of the piston after run-out to increase the hydraulic pressure in said cylinder, a second stage hydraulic booster cylinder having a hollow differential piston therein with faces of different effective area, means communicating through said hollow piston supplying hydraulic pressure from said first stage cylinder to said wheel cylinders in the first boost stage, control means operable upon power source run-out including a movable wall, resilient means acting on said wall tending to move the same, means connecting said source of power to one side of said wall opposing said resilient means and the other side of said wall to said expansible motor to receive power modulated by said valve means, so that said wall is moved by the action of said resilient means upon power source run-out, and means including a valve operated by movement of said wall for cutting off communication through said hollow differential piston and placing a larger face thereof in communication with said first stage cylinder for applying hydraulic pressure after run-out against said larger face of the differential piston while providing a smaller face for producing hydraulic pressure for the wheel cylinders, whereby the hydraulic pressure in said first stage cylinder is hydraulically multiplied after power source run-out to obtain a second stage boost.

5. In a hydraulic braking system having a pedal and wheel cylinders to apply the brakes, the combination comprising, a first stage cylinder with a piston therein for producing hydraulic pressure for the wheel cylinders, an expansible motor mechanism for acting on said piston to increase the hydraulic pressure in said cylinder, a source of power to operate said expansible motor mechanism, pedal operated valve means to direct power from said source to said expansible motor mechanism in the first boost stage until power source run-out is reached, means connecting said pedal to said piston for continued movement of the piston after run-out to increase the hydraulic pressure in said cylinder, a second stage hydraulic booster cylinder with a differential piston therein having a smaller area for producing hydraulic pressure for the wheel cylinders, and a larger area, and control means responsive to power modulated by said pedal operated valve means for applying hydraulic pressure in said first stage cylinder after power source run-out against said larger area of the differential piston, said control means including a movable wall, resilient means acting on said wall tending to move the same, means connecting said source of power to one side of said wall opposing movement by said resilient means and the other side of said wall to said expansible motor to receive power modulated by said valve means, and means including a valve operated by movement of said wall by said resilient means upon power source run-out for applying hydraulic pressure in said first stage cylinder against said larger area of the diffierential piston, whereby the hydraulic pressure in said first stage cylinder is hydraulically multiplied after run-out to obtain a second stage boost.

6. In a hydraulic braking system having a pedal and wheel cylinders to apply the brakes, the combination comprising, a first stage cylinder with a piston therein for producing hydraulic pressure for the wheel cylinders, an expansible motor mechanism for acting on said piston to increase the hydraulic pressure in said cylinder, a source of power to operate said expansible motor mechanism, pedal operated valve means to direct power from said source to said expansible motor mechanism in the first boost stage until power source run-out is reached, means connecting said pedal to said piston for continued movement of the piston after run-out to increase the hydraulic pressure in said cylinder, a second stage hydraulic booster cylinder with a differential piston therein having a larger area responsive to the hydraulic pressure in said first stage cylinder after run-out and a smaller area for producing hydraulic pressure for the wheel cylinders, a valve controlling communication between said first stage cylinder and said larger area of the differential piston, and means for operating said last-named valve upon power source run-out whereby the hydraulic pressure in the first stage cylinder is applied to said larger area and hydraulically multiplied by said differential piston after run-out to obtain a second stage boost.

7. In a hydraulic braking system having a pedal and wheel cylinders to apply the brakes, the combination comprising, a first stage cylinder with a piston therein for producing hydraulic pressure for the wheel cylinders, an expansible motor mechanism for acting on said piston to increase the hydraulic pressure in said cylinder, a source of power to operate said expansible motor mechanism, pedal operated valve means to direct power from said source to said expansible motor mechanism in the first boost stage until power source run-out is reached, means connecting said pedal to said piston for continued movement of the piston after run-out to increase the hydraulic pressure in said cylinder, a second stage hydraulic booster cylinder with a differential piston therein having a larger area responsive to the hydraulic pressure in said first stage cylinder after run-out and a smaller area for producing hydraulic pressure for the wheel cylinders, a valve for controlling communication between said first stage cylinder and said larger area of the differential piston, means including a differential pressure responsive member for operating said last-named valve, and means for supplying power from said source and power modulated by said pedal operated valve means to operate said member whereby the hydraulic pressure in the first stage cylinder is applied to said larger area and hydraulically multiplied by said differential piston after run-out to obtain a second stage boost.

8. In a hydraulic braking system having a pedal and wheel cylinders to apply the brakes, the combination comprising, a first stage cylinder with a piston therein for producing hydraulic pressure for the wheel cylinders, an expansible motor mechanism for acting on said piston to increase the hydraulic pressure in said cylinder, a source of power to operate said expansible motor mechanism, pedal operated valve means to direct power from said source to said expansible motor mechanism in the first boost stage until power source run-out is reached, means connecting said pedal to said piston for continued movement of the piston after run-out to increase the hydraulic pressure in said cylinder, a second stage hydraulic booster cylinder with a hollow differential piston therein, means communicating through said hollow piston for applying hydraulic pressure from said first stage cylinder for said wheel cylinders in the first boost stage, and valve means carried by said differential piston including a valve element movable to a closed position upon power source run-out for closing communication through said hollow piston and applying the hydraulic pressure in said first stage cylinder after run-out to a larger area of said differential piston, said differential piston also having a smaller area for producing hydraulic pressure for the wheel cylinders whereby the hydraulic pressure in the first stage cylinder is hydraulically multiplied after run-out to obtain a second stage boost.

9. In a hydraulic braking system having a pedal and wheel cylinders to apply the brakes, the combination comprising, a first stage cylinder with a piston therein for producing hydraulic pressure for the wheel cylinders, an expansible motor mechanism for acting on said piston to increase the hydraulic pressure in said cylinder, a source of power to operate said expansible motor mechanism, pedal operated valve means to direct power from said source to said expansible motor mechanism in the first boost stage so that said motor operates said piston to develop pressure at a first boost ratio until power source run-out is reached, means connecting said pedal to said piston for continued movement of the piston after run-out to increase the hydraulic pressure in said cylinder, and a second stage hydraulic booster cylinder with a differential piston therein having a larger area responsive to the hydraulic pressure in said first stage cylinder after run-out and a smaller area for producing hydraulic pressure for the wheel cylinders, with the larger area of said differential piston also larger than the effective area of said first stage piston and all said areas so related that the hydraulic pressure in the first stage cylinder is hydraulically multiplied after run-out to obtain a second stage boost at substantially the same ratio as said first boost ratio approaching the point of run-out.

10. In a hydraulic braking system having a pedal and wheel cylinders to apply the brakes, the combination comprising, a first stage cylinder with a piston therein for producing hydraulic pressure for the wheel cylinders, an expansible motor mechanism for acting on said piston to increase the hydraulic pressure in said cylinder, a source of power to operate said expansible motor mechanism, pedal operated valve means to direct power from said source to said expansible motor mechanism in the first boost stage until power source run-out is reached, means connecting said pedal to said piston for continued movement of the piston after run-out to increase the hydraulic pressure in said cylinder, a second stage hydraulic booster cylinder with a differential piston therein having a larger area, and a smaller area for producing hydraulic pressure for the wheel cylinders, whereby the hydraulic pressure in the first stage cylinder is hydraulically multiplied by movement of said differential piston after run-out to obtain a second stage boost, spring means tending to move said differential piston in the direction to produce hydraulic pressure for the wheel cylinders, control means opposing said spring means and holding said differential piston against movement, said control means including a movable wall connected so as to be subjected to the source of power and the same modulated by the pedal operated valve means and applied to the expansible motor mechanism, and arranged to be overcome by said spring means when the differential between source power and the same modulated approaches zero at power source run-out, and valve means operated by movement of said differential piston by said spring means at run-out and arranged to direct hydraulic pressure from said first stage cylinder to said larger area of said differential piston.

References Cited in the file of this patent
UNITED STATES PATENTS

| | | |
|---|---|---|
| Re. 23,081 | Rockwell | Jan. 25, 1949 |
| 2,260,491 | Stelzer | Oct. 28, 1941 |
| 2,353,755 | Price | July 18, 1944 |
| 2,395,223 | Ingres | Feb. 19, 1946 |
| 2,685,170 | Price | Aug. 3, 1954 |
| 2,804,178 | Whitten | Aug. 27, 1957 |